United States Patent [19]

Infanger

[11] Patent Number: 5,655,427
[45] Date of Patent: Aug. 12, 1997

[54] STAPLING DEVICE WITH ROTARY CUTTING ELEMENT

[75] Inventor: Rudolf Infanger, Hinwil, Switzerland

[73] Assignee: Ferag AG, Switzerland

[21] Appl. No.: 447,207

[22] Filed: May 22, 1995

[30] Foreign Application Priority Data

May 25, 1994 [CH] Switzerland .................. 01 612/94

[51] Int. Cl.[6] .................................................. B25C 5/00
[52] U.S. Cl. ........................ 83/673; 83/349; 83/663; 227/91
[58] Field of Search .................. 83/950, 673, 676, 83/663, 906, 913, 83; 227/91, 93, 97, 81

[56] References Cited

U.S. PATENT DOCUMENTS

| | | | |
|---|---|---|---|
| 1,813,340 | 7/1931 | Conti | 83/154 |
| 2,414,390 | 1/1947 | Pagliarul | 227/91 X |
| 3,358,536 | 12/1967 | Yonkers | 83/54 |
| 3,403,832 | 10/1968 | Pabich | 227/91 |
| 3,762,622 | 10/1973 | Noren | 227/81 |
| 3,822,621 | 7/1974 | Knights et al. | 83/23 |
| 4,253,363 | 3/1981 | Fram | 83/913 X |
| 4,318,555 | 3/1982 | Adamski | 227/91 X |
| 4,512,506 | 4/1985 | Fischer | 227/81 X |
| 4,664,006 | 5/1987 | Mitchell | 83/673 X |
| 4,686,876 | 8/1987 | Hume et al. | 83/455 |
| 4,750,661 | 6/1988 | Pane | 227/81 X |
| 5,113,732 | 5/1992 | Hansch | 83/154 |
| 5,147,080 | 9/1992 | Assink | 227/91 X |
| 5,241,887 | 9/1993 | Wolff et al. | 83/401 |
| 5,356,125 | 10/1994 | Hansch et al. | 227/81 X |
| 5,454,523 | 10/1995 | Matsuda | 241/242 |

FOREIGN PATENT DOCUMENTS

| | | |
|---|---|---|
| 325928 | 11/1975 | Australia . |
| 657187 | 2/1938 | Germany . |
| 9311705.1 | 10/1993 | Germany . |
| 317438 | 1/1957 | Switzerland . |

Primary Examiner—Rinaldi I. Rada
Assistant Examiner—Elizabeth Stanley
Attorney, Agent, or Firm—Brinks Hofer Gilson & Lione

[57] ABSTRACT

A cutting device for elongated objects, especially for wire, having a cutting element which is movable relative to a shearing element by means of a drive. The cutting element is of disk-shaped configuration and its periphery is configured, at least in segments, as a cutter. The cutting element is coupled to the drive in such a way that different segments of the cutter for the execution of a respective cut, can be moved one after the other past the shearing element.

15 Claims, 3 Drawing Sheets

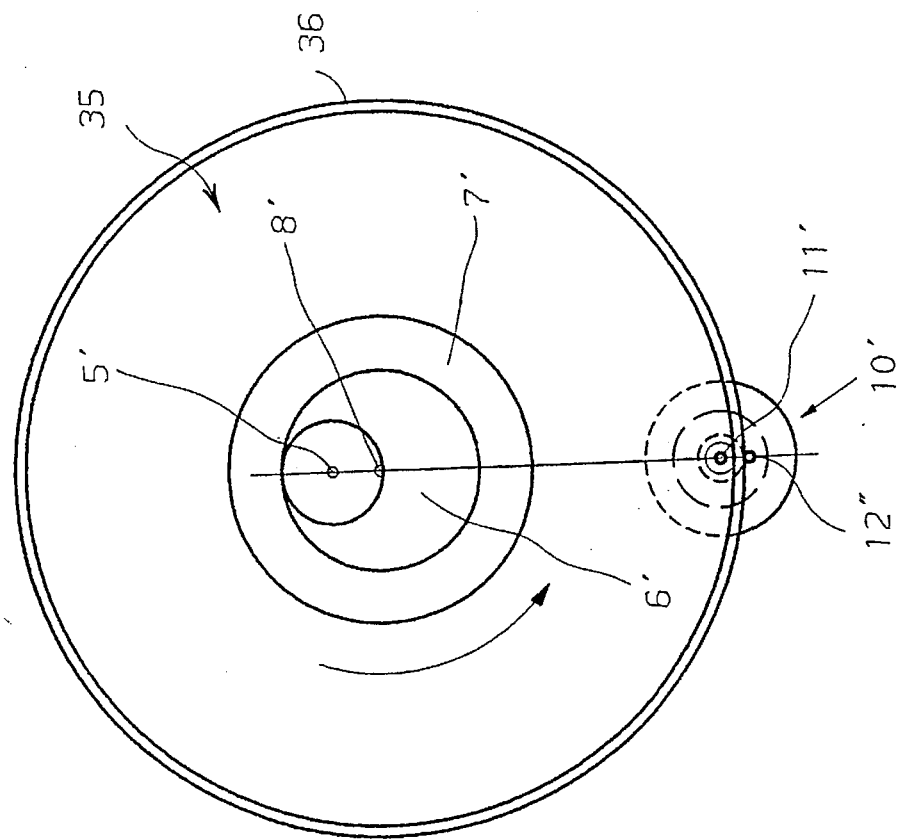
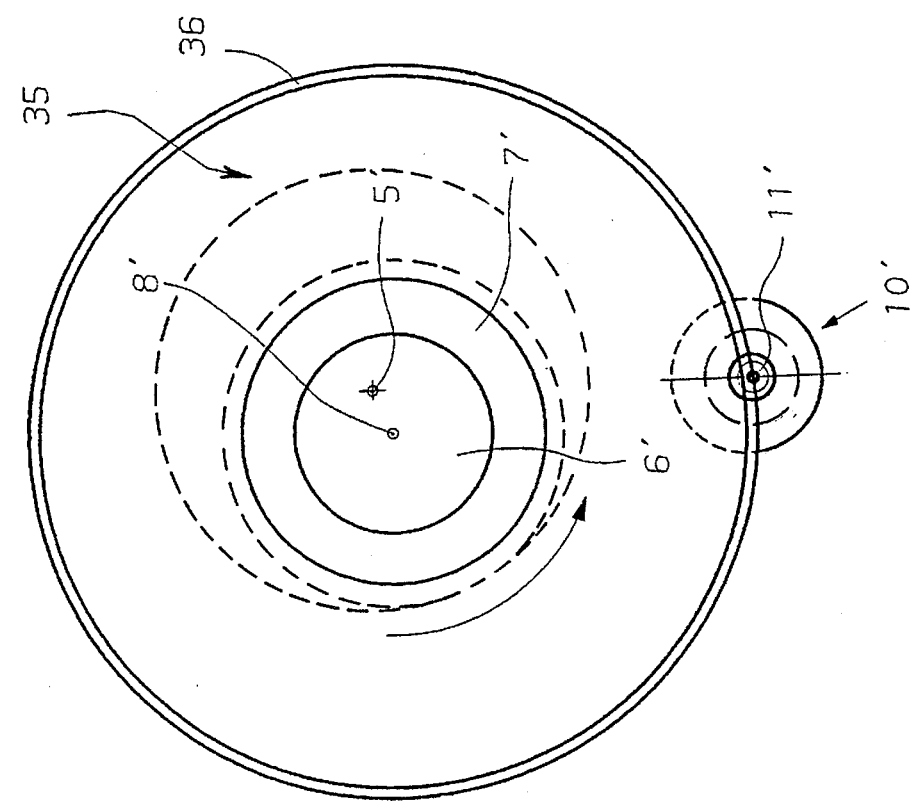

STAPLING DEVICE WITH ROTARY CUTTING ELEMENT

BACKGROUND OF THE INVENTION

The invention relates to a cutting device for elongated objects, especially for wire, having a cutting element which is movable relative to a shearing element.

Known cutting devices operate such that the cutting element is moved linearly to and from the shearing element. In these devices the elongated object or the wire is severed whenever the cutter of the cutting element is moved past that edge of the shearing element which interacts with the cutter.

Cutting devices of this type can be used, for example, to cut a wire, which is continuously or intermittently unreeled from a delivery spool, into individual wire pieces. One possible field of application for such cutting devices is in stapling bays. In such stapling bays, a plurality of printing products are compiled into a composite by means of a staple. The wire which is unreeled from a delivery spool is cut into wire pieces of equal length, which are bent in the stapling bay into a U-shaped staple. Then the products to be joined together are stapled by means of the staple.

A drawback with the known cutting devices is that, due to the rapid wearing of the cutting element, long service lives are unattainable. Additionally, a very high cutting sequence rate is also often impracticable.

Therefore, in view of the above it is an object of the present invention to provide a cutting device with which long service lives are attainable.

It is a further object to provide a cutting device with a higher cutting sequence rate relative to known devices.

SUMMARY OF THE INVENTION

These and other objects are achieved according to the invention by virtue of a cutting apparatus which includes a cutting element, which is of disk-shaped configuration. The cutting element includes on its periphery a plurality of cutting regions which are moved past a shearing element in a predefined or arbitrary sequence. This ensures that cutting is not always performed using the same quickly blunted cutting region. Rather, a plurality of cutting regions of the cutting element are employed alternately.

Relative to the prior art, in which, in all successive cuts, the same cutting region is employed, the service life of a cutting device according to the invention can be substantially increased. This is a result of employing a plurality of cutting regions, one after the other, for successive cuts. The more cutting regions there are provided on the cutting element and employed, the more slowly the individual cutting regions are blunted thereby resulting in a longer service life of the device.

Preferably, a cutting device according to the invention can be used, for example, in a stapling bay for printed products. In such bays, wire pieces of equal length are respectively cut off from a wire stock (stored on a delivery spool) in rapid succession and are then bent into staples. Other applications, however, are also contemplated, in which, for example, wire pieces of different lengths are required in a time-variable cutting sequence.

BRIEF DESCRIPTION OF THE DRAWINGS

Preferred embodiments of the invention are explained by way of example below with reference to the following drawings.

FIG. 4 shows a schematic representation of a second embodiment of a cutting device according to the invention in a first operating state.

FIG. 5 shows a device according to FIG. 4 in a second operating state.

DETAILED DESCRIPTION OF THE PRESENTLY PREFERRED EMBODIMENTS

Figure 1:
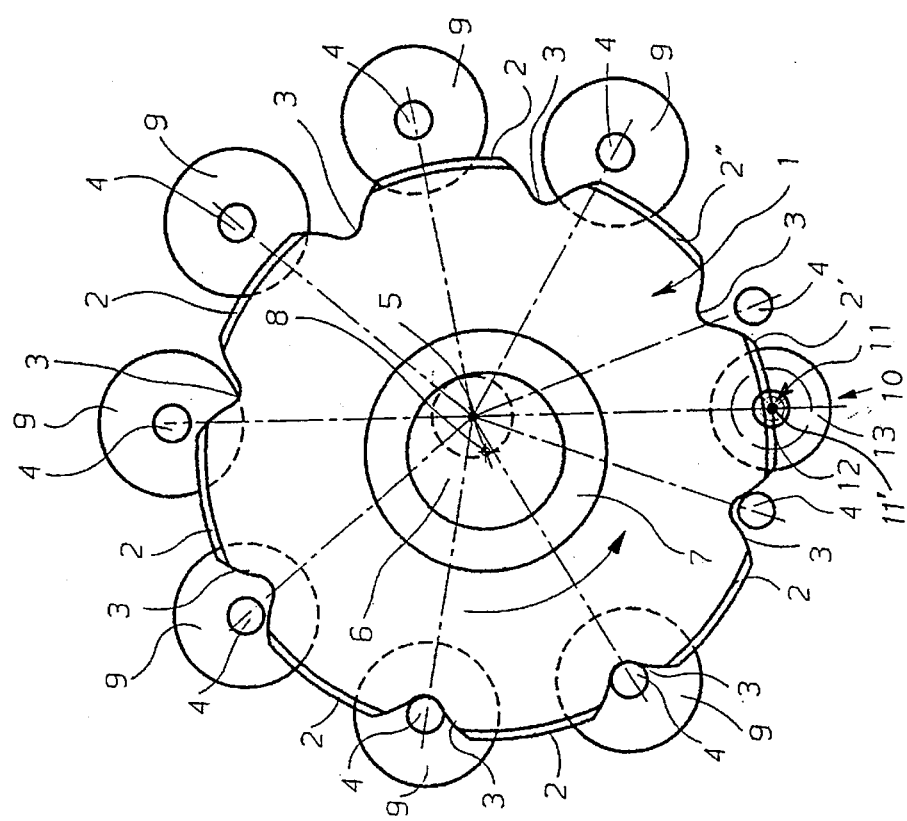
FIG. 1 shows a schematic representation of a first embodiment of a cutting device according to the invention in a first operating state.

FIG. 1 shows a cutting element 1, which is configured as an essentially circular, disk-shaped blade and which is provided with eight cutter segments 2, 2', 2" scattered evenly around its outer periphery.

In each case, between two mutually adjacent cutter segments 2, 2', 2", there is respectively provided a recess 3, which extends radially inwards. In each case, the recess has essentially a sine half-wave shape.

The cutting element 1 is provided with eight cutter segments 2, 2', 2" and eight recesses 3 disposed respectively therebetween. This cutting element is disposed within an arrangement of nine journals 4 extending perpendicularly to the cutting element 1. Here, the journals 4 are disposed or scattered evenly on a circular path about a center point 5. The shape of the individual journals 4 is chosen such that they can be brought into engagement with the recesses 3.

In the example represented in FIG. 1, the journals 4 have a cylindrical shape.

The distance between adjacent journals 4 corresponds to the distance between adjacent recesses 3. Thus, the cutting element 1 is movable relative to the journals 4 into a position in which two adjacent, cylindrical journals 4 bear with the inner region of their contacting surface flatly against two adjacent recesses 3.

The circular, disk-shaped cutting element 1 is coupled by at least one ball bearing 7 to a shaft 6 which runs perpendicularly to the cutting element 1. Here, the central longitudinal axis of the shaft 6 extends through the center point 8 of the circular, disk-shaped cutting element. The eccentric rotational axis of the shaft 6, which is acted upon by a drive (not represented), extends through the center point 5 of the circle on which the journals 4 are disposed.

When the shaft 6 is acted upon, the center point 8 of the circular, disk-shaped cutting element 1 consequently describes a circular path about the center point 5 of the circle on which the journals 4 are disposed. The radius of this circular path corresponds to the distance between the two center points 5 and 8.

The journals 4 extend respectively out of a circular, disk-shaped baseplate 9, the surfaces of which run parallel to the disk-shaped cutting element 1 and form a bearing surface for the bottom side of the disk-shaped cutting element 1.

Between two adjacent journals 4 there is disposed a shearing element 10. In the example represented in FIG. 1, the shearing element 10 is formed by the frontal end region 11' of an eyelet 11. The wire 12 to be severed is transported through the eyelet 11 perpendicularly to the plane of projection, the inside diameter of the eyelet 11 being slightly larger than the outside diameter of the wire 12 guided through the eyelet 11.

The frontal end region of the eyelet 11 is formed by a baseplate 13, the surface of which lies in a plane with the surfaces of the baseplates 9.

Figure 2:
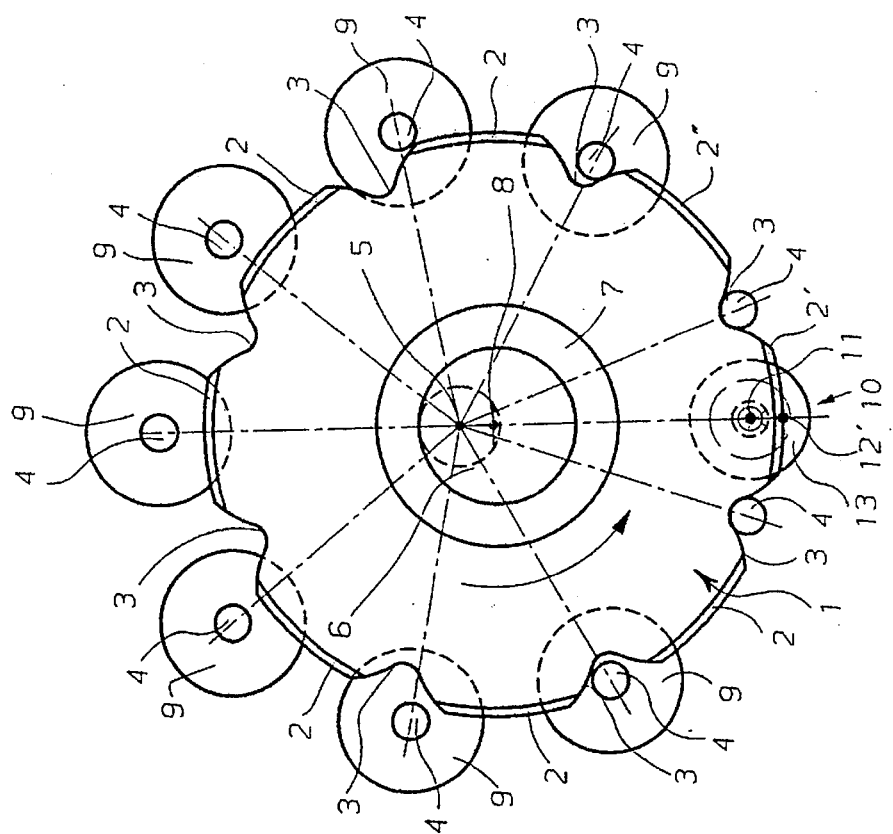
FIG. 2 shows a device according to FIG. 1 in a second operating state.

The operation of the described device is explained below with reference to FIGS. 1 and 2. FIG. 1 shows the device in a first operating state and FIG. 2 showing the same device in a second operating state.

When the eccentrically driven shaft 6 is acted upon, it describes a rotation about an axis running through the center point 5 of the circle on which the journals 4 are disposed. The axis runs parallel to, and at a distance apart from, the central longitudinal axis of the shaft 6. Accordingly, the center point 8 of the circular, disk-shaped cutting element 1 also describes a circular orbit about the center point 5 of the circle on which the journals 4 are disposed.

The ball bearing 7 provided between the shaft 6 and the cutting element 1 enables a relative rotary motion to be made between the shaft 6 and the cutting element 1.

The sum of the distance between the two center points 5 and 8 and the distance between the center point 8 of the cutting element 1 from the, relative to the center point 8, innermost region of the recesses 3 is equal to the distance between the center point 5 and the, relative to the center point 5, innermost region of the journals 4. This ensures that when the shaft 6 is rotated in the direction of the arrow shown in FIG. 1, there is always at least one recess 3 currently engaged with a journal 4. Upon this rotation, the cutting element 1 is rolled by way of its recesses 3 on the journal 4. Thereupon respectively adjacent recesses 3 enter successively into engagement with respectively adjacent journals 4.

Since a total of nine journals 4 but only eight recesses 3 are provided, it is ensured that the recesses 3, which have been brought into engagement with a journal 4, enter next into engagement with the adjacent journal 4 in the clockwise direction. Upon rotation of the shaft 6, the recesses 3 thereby describe, in the clockwise direction, a wave-shaped orbit about the center point 5 of the circle on which the journals 4 are disposed.

Just like the recesses 3, the cutter segments 2, 2', 2" also describe a wave-shaped orbit about the center point 5. This ensures that, upon successive revolutions of the eccentrically driven shaft 6, respectively adjacent cutter segments 2, 2', 2" are moved over the eyelet 11 and there effect the cutting operation.

In the operating position of the device which is represented in FIG. 1, the cutter segment 2' is located precisely over the opening of the eyelet 11 (which means that the wire 12 is just in the process of being cut).

In FIG. 2, the device according to FIG. 1 is represented in an operating position in which the shaft 6 has been twisted relative to FIG. 1 by an angle of approximately 70° in the counter-clockwise direction.

In FIG. 2, the eccentrically driven shaft 6 is in the position in which it ends up at a minimal distance from the eyelet 11. In this position, the wire piece 12' is already completely severed (since the cutter segment 2' has been moved over the opening of the eyelet 11).

Upon a 360° rotation of the shaft 6 relative to the operating position represented in FIG. 2, all the recesses 3 respectively enter into engagement with a journal 4 exactly once. Thereupon, the cutter segment 2" is in the position in which the cutter segment 2' is found (in the representation according to FIG. 2).

The described working principle enables a respective cut to be executed with each revolution of the shaft 6 about the center point 5. The cutting operation is respectively effected, with respect to successive cuts, by cutter segments 2, 2', 2" which are mutually adjacent in the clockwise direction.

For the described working principle, it is not necessary for the number of journals 4 to be exactly greater by one than the number of recesses 3. The number of journals must simply be guaranteed to be greater than the number of recesses 3. In this case, however, all cutter segments situated between the recesses 3 are only assured of being called upon for cutting purposes where either the number of journals 4 is even and the number of recesses 3 odd or the number of journals 4 is odd and the number of recesses 3 even.

A basic advantage of the device according to FIGS. 1 and 2 is that cuts can be executed at a very high cutting sequence rate. This is due to the rotary wave motion of the cutter segments 2 which can be realized more easily and more rapidly than a to-and-from motion of a cutting element according to the prior art.

A further advantage of the device represented in FIGS. 1 and 2 is that the cutter segments 2 are not moved linearly over the shearing element 10. Rather, by virtue of the rotary wave motion, a drawing cut is made, which necessarily produces a lesser load upon the cutter and a better quality cut.

Figure 3:
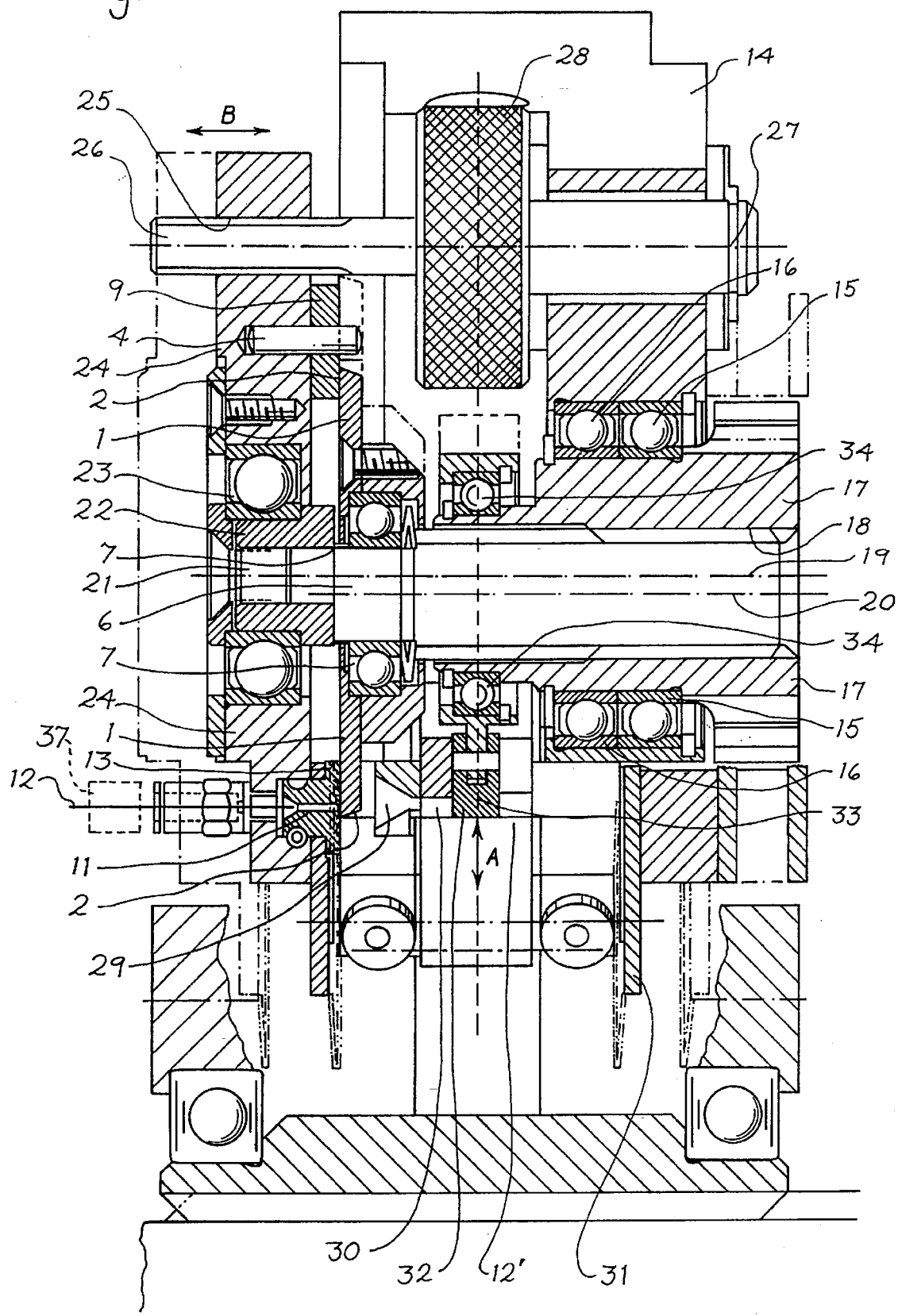
FIG. 3 shows a section through a cutting device working according to the principle represented in FIGS. 1 and 2.

FIG. 3 shows a section through a cutting device according to the invention, which operates according to the principle represented in FIGS. 1 and 2.

For reasons of clarity, those structural elements of FIG. 3 having an equivalent in structural elements of FIGS. 1 and 2 have been provided with the same reference symbols used in FIGS. 1 and 2.

Mounted in a housing 14, by means of two ball bearings 15, 16 which are axially harnessed together, there is an essentially cylindrical sleeve 17. The sleeve 17 has an eccentric bore 18 in which the shaft 6 is held such that it is axially displaceable.

The rotational axis of the sleeve 17 is denoted by the reference symbol 19, and the central longitudinal axis of the shaft 6 is denoted by reference symbol 20. With reference to FIGS. 1 and 2, it can be seen that the rotational axis 19 of the sleeve 17 extends through the center point 5 and the central longitudinal axis 20 of the shaft 6 extends through the center point 8.

In the region of the shaft 6 facing away from the ball bearings 15, 16, said shaft is no longer surrounded by the sleeve 17. In this region, the shaft 6 is connected to the inner race of the ball bearing 7, to whose outer race there is attached the essentially circular, disk-shaped cutting element 1. The cutting element 1 can thus rotate freely about the central longitudinal axis 20 of the shaft 6. At its periphery, the cutting element 1 is provided with cutter segments 2.

The shaft 6 has a cylindrical continuation 21 on the side of the ball bearing 7 facing away from the sleeve 17. The continuation 21 has a smaller diameter than the shaft 6 and is connected to the shaft 6 such that its center axis coincides with the rotational axis 19 of the sleeve 17. The cylindrical continuation 21 is firmly received in a sleeve 22, which is mounted, by means of a ball bearing 23, rotatably in a holding element 24. The ball bearings 15, 16, 23 are disposed concentrically to one another.

The holding element 24 is mounted such that it is slidably displaceable relative to the housing 14 along the axes 19, 20. For this purpose, the holding element 24 has a threaded bore 25, in which there is received a threaded bolt 26. The axis 27 of the bolt 26 runs parallel to the axes 19, 20. The bolt 26 is mounted rotatably about its axis 27 in the housing 14 and is provided with a knurl 28.

Embedded in the holding element 24, on the side facing the cutting element 1, are the journals 4 extending perpendicularly to the disk-shaped cutting element 1 (the journals fulfill the function described with respect to FIGS. 1 and 2). Because of the sectional representation of FIG. 3, and of the journals 4 disposed on a circular path, only one is visible.

On the holding element 24 there is provided a hollow-cylindrical baseplate 9 which surrounds the journal 4. The surface of the baseplate 9 facing away from the holding element 24 forms a bearing surface for the surface of the cutting element 1 which faces the holding element 24.

In the holding element 24 there is further provided the eyelet 11. The wire 12 is conveyed through the eyelet 11 in the direction of the side of the holding element 24 facing the cutting element 1. The eyelet 11 herein includes a baseplate 13, whose surface facing away from the holding element 24 lies in a plane with the corresponding surface of the baseplate 9. The surfaces of the baseplates 9 and of the baseplate 13 thus form a bearing surface over which the cutting element 1 can slide in the rotary wave motion described with respect to FIGS. 1 and 2.

On the side of the cutting element 1 facing away from the eyelet 11 there is located a funnel-shaped guide element 29. The guide element 29 is aligned coaxially with the eyelet 11 and ensures that the wire 12 transported through the eyelet 11 makes its way into a guide groove 30 extending perpendicularly to the disk-shaped cutting element 1.

At the end of the guide groove 30 facing away from the eyelet 11, there is provided a stop element 31 for the end of the wire to be severed.

The device represented in FIG. 3 further includes an ejector ram 32, which is movable along the double arrow A and serves to punch a cut-off wire piece out of the guide groove 30. The ejector ram 32 is acted upon by a drive element 33, which, in turn, is connected by a ball bearing 34 to the eccentrically driven shaft 6.

Prior to the cutting device according to FIG. 3 being started up, the desired wire piece length is set, using the knurl 28, by the holding element 24 being shifted along the double arrow B relative to the stop element 31 until the distance between the stop element 31 and the surface, facing the stop element 31, of the baseplate 13 surrounding the eyelet 11 corresponds to the desired wire piece length. The holding element 24 and the stop element 31 are displaced symmetrically to a center plane in opposite directions. The cutting element 1, the eyelet 11, the journals 4 and the shaft 6 are also displaced in common with the holding element 24 relative to the stationary housing 14. The position of the parts connected fixedly to the holding element 24, when the maximum possible wire piece length is set, is illustrated in FIG. 3 in dash-dot representation.

During operation of the device according to FIG. 3, the wire 12 is transported from a schematically shown feed apparatus 37 continuously or intermittently through the eyelet 11 in the direction of the stop element 31.

The cutting element 1 performs the rotary wave motion described with respect to FIGS. 1 and 2, thereby enabling drawing cuts to be made in rapid sequence using different cutter regions of the cutting element 1.

For each revolution of the shaft 6 about the rotational axis 19 of the sleeve 17, a cut is executed. Synchronously with this cutting motion, an up-and-down motion of the drive element 33, which is likewise coupled to the shaft 6, is effected, thereby ultimately giving rise to a synchronized motion between the cutting element 1 and the ejector ram 32. In this way, each cut-off wire piece 12' is moved out of the guide groove 30, even as the cutting operation is in progress. Then, each cut-off wire piece 12' is delivered to a wire piece take-up wheel, which attends to the continuous evacuation of the wire pieces which are individually cut off one after the other.

The cutting device represented in FIG. 3 can be coupled to a wire piece take-up wheel or stapling bay in such a way that it can be easily swiveled away from this to enable repairs or adjustment work to be carried out relatively effortlessly.

FIGS. 4 and 5 show, in accordance with FIGS. 1 and 2, two different operating positions of an alternative embodiment of a cutting device according to the invention.

The cutting element 35 is in this case configured as a circular, disk-shaped blade having a cutting edge 36 extending continuously along its outer periphery.

Analogously to FIGS. 1 and 2, the cutting element 35 is connected by a ball bearing 7' to a shaft 6' extending perpendicularly to the circular, disk-shaped cutting element 35. The central longitudinal axis of the shaft runs through the center point 8' of the circular, disk-shaped cutting element 35. The shaft 6' is herein likewise acted upon by an eccentric drive. The eccentric drive attends to a rotation of the shaft 6' about an axis spaced at a parallel distance apart from the central longitudinal axis of the shaft and running through the point 5'.

Likewise in accordance with FIGS. 1 and 2, there is further provided a shearing element 10' comprising an eyelet 11'. The shearing element 10' is disposed such that the frontal end region of the eyelet 11', through which the wire to be severed runs, upon rotation of the shaft 6', is crossed by the cutter 36 disposed along the periphery of the cutting element 35.

FIG. 4 represents an operating position in which a cutting operation is just being triggered, whilst in the operating position according to FIG. 5. The cutting operation is already concluded, as is discernible from the wire piece 12", this being displaced relative to the eyelet 11'. Between the two operating positions represented in FIGS. 4 and 5, a rotation of the shaft 6' of approximately 70° has taken place.

During operation of the device according to FIGS. 4 and 5, the cutting element 35 is freely rotatable about the shaft 6'. This results in different regions of the cutter 36 being employed according to statistical distribution, a rotary relative motion between the shaft 6' and the cutting element 35 being generated solely on the basis of friction forces. Corresponding friction forces arise, for example, in the ball bearing 7', resulting from the cutting operation itself or from the air friction of the cutting element 35.

Where it is desired to have a guaranteed defined, non-arbitrary sequence of use of different regions of the cutter 36, the cutting element 35 can be coupled to a gearwheel 39 which is disposed concentrically thereto. During operation of the device, the gearwheel 39 is in constant engagement with an internal gear rim 40, the inside diameter of which is larger than the outside diameter of the gearwheel 39. In this case, the gearwheel 39 coupled to the cutting element rolls on the internal gear rim 40, on the one hand, the point 8' describing a circular orbit about the point 5' and, on the other hand, the engagement of the gearwheel 39 and gear rim 40 assuring a defined relative motion between the shaft 6' and the cutting element 35.

In association with the invention, an optional number of alternative drive mechanisms can be envisaged, provided that, in the execution of successive cuts, different segments of the cutter are guaranteed to be employed.

It will be understood that a wide range of changes and modifications to the embodiments described above will be apparent to those skilled in the art, and are also contemplated. It is therefore intended that the foregoing detailed description be regarded as illustrative rather than limiting, and that it be understood that it is the following claims, including all equivalents which are intended to define the spirit and scope of this invention.

I claim:

1. A cutting device for elongated objects comprising:
   a shearing element;
   an eccentrically driven shaft;
   a cutting element having a circular, disk-shaped configuration, said cutting element mounted for free rotation on said eccentrically driven shaft, said eccentrically driven shaft extending centrally and perpendicularly through said cutting element and moves said cutting element along a cutting plane relative to said shearing element, said cutting element having an outer periphery and a cutter extending around said outer periphery, the cutter being configured in segments; and
   drive means driving said cutting element for rotation about said eccentrically driven shaft such that a respective segment of the cutter, for an execution of a cut, is moved past said shearing element, and successive segments of said cutting element, for the execution of successive cuts, are moved one after another past the shearing element.

2. The cutting device as claimed in claim 1, wherein the cutting element is a circular, disk-shaped blade having a number n of cutter segments disposed evenly around said outer periphery.

3. The cutting device as claimed in claim 2, wherein said circular, disk-shaped blade:
   includes, between the cutter segments, recesses extending a distance along and inward of said outer periphery of the circular, disk-shaped blade;
   is confined within a circular path defined by at least n+1 journals, said journals extend perpendicularly to the cutting element and are brought into engagement with said recesses; and
   the distance between adjacent recesses of the cutting element corresponds to the distance between adjacent journals.

4. The cutting device as claimed in claim 3, wherein the shearing element is disposed essentially between two adjacent journals.

5. The cutting device as claimed in claim 1, wherein said cutting device further comprises: an eyelet, said eyelet including a frontal end region forming said shearing element, the internal dimension of said eyelet being is sized to receive the elongated object to be cut.

6. The cutting device as claimed in claim 1, further comprising a stop element that is offset from the cutting plane a predetermined distance in a feeding direction of the elongated object to be cut.

7. The cutting device as claimed in claim 6, wherein said predetermined distance between the cutting plane and the stop element is adjustable.

8. The cutting device as claimed in claim 1, comprising a guide groove to receive the elongated object to be cut, said guide groove being disposed, seen in a feeding direction of the elongated object to be cut, downstream of the cutting element, said guide groove extending perpendicularly to the circular, disk-shaped cutting element.

9. The cutting device as claimed in claim 8, further comprising an ejector ram to eject a section of the elongated object that has been severed from the elongated object out of the guide groove.

10. The cutting device as claimed in claim 9, wherein said ejector ram is activated by said eccentrically driven shaft in synchrony with said cutting element.

11. The cutting device as claimed in claim 1, wherein the eccentrically driven shaft is rotatably mounted on each outer race of two ball bearings, which are each disposed longitudinally of said shaft on each side of said cutting element.

12. The cutting device as claimed in claim 1 further comprising a continuously driven feed apparatus for the elongated object.

13. The cutting device as claimed in claim 1 further comprising an intermittently driven feed apparatus for the elongated object.

14. The cutting device as claimed in claim 1, wherein the cutting element is configured as a circular, disk-shaped blade and said cutter segments form a continuous cutter around an outer periphery of said circular, disk-shaped blade.

15. The cutting device as claimed in claim 14, wherein the circular, disk-shaped blade is coupled to a gearwheel having a diameter which is disposed concentrically with respect to said circular, disk-shaped blade and which, during operation of the device, is in constant engagement with an internal gear rim, said internal gear rim having a diameter which is larger than said diameter of the gearwheel.

* * * * *